(12) United States Patent
Tae et al.

(10) Patent No.: US 7,952,654 B2
(45) Date of Patent: May 31, 2011

(54) INFORMATION PROCESSING APPARATUS AND MANUFACTURING METHOD THEREOF

(75) Inventors: Gi-hyun Tae, Yongin-si (KR); Ki-hyub Sung, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 866 days.

(21) Appl. No.: 11/606,238

(22) Filed: Nov. 30, 2006

(65) Prior Publication Data
US 2007/0126946 A1 Jun. 7, 2007

(30) Foreign Application Priority Data
Dec. 1, 2005 (KR) .................. 10-2005-0116559

(51) Int. Cl.
*G02F 1/1333* (2006.01)
(52) U.S. Cl. ..... 349/58; 349/60; 361/679.26; 361/679.3
(58) Field of Classification Search .................. 349/58, 349/59, 60; 361/679.21, 679.26, 679.3
See application file for complete search history.

(56) References Cited

U.S. PATENT DOCUMENTS

| 6,104,451 | A  | * | 8/2000 | Matsuoka et al. | 349/58 |
| 6,421,247 | B1 |   | 7/2002 | Fuchimukai | |
| 2003/0103173 | A1 | * | 6/2003 | Satonaka | 349/58 |
| 2003/0227581 | A1 | * | 12/2003 | Sung et al. | 349/58 |
| 2004/0239828 | A1 |   | 12/2004 | Cho | |
| 2005/0083447 | A1 | * | 4/2005 | Yu | 349/58 |

FOREIGN PATENT DOCUMENTS

| KR | 1999-30753 | 7/1999 |
| KR | 20-232049 | 7/2000 |
| KR | 10-304190 | 7/2001 |
| KR | 20-305308 | 3/2003 |
| KR | 2004-6992 | 1/2004 |
| KR | 2004-9621 | 1/2004 |
| KR | 2004-96097 | 11/2004 |

* cited by examiner

*Primary Examiner* — Michael H Caley
(74) *Attorney, Agent, or Firm* — Stanzione & Kim, LLP

(57) ABSTRACT

An information processing apparatus includes a front cover having a display opening to display an image of a display panel, a rear cover which is coupled with the front cover, at least one holder which is formed on a first end of the front cover to prevent the display panel from being separated from the front cover, and a movable holder which is provided on a second end of the front cover to face the holder and prevents the display panel from being separated from the front cover.

22 Claims, 11 Drawing Sheets

INFORMATION PROCESSING APPARATUS AND MANUFACTURING METHOD THEREOF

CROSS-REFERENCE TO RELATED APPLICATIONS

This application claims priority under 35 U.S.C. §119(a) from Korean Patent Application No. 2005-0116559, filed on Dec. 1, 2005, in the Korean Intellectual Property Office, the disclosure of which is incorporated herein in its entirety by reference.

BACKGROUND OF THE INVENTION

1. Field of the Invention

The present general inventive concept relates to an information processing apparatus and a manufacturing method thereof, and more particularly, to an information processing apparatus which is assembled without difficulty and has a light and simple configuration, and a manufacturing method thereof.

2. Description of the Related Art

Generally, an information processing apparatus processes various information to provide convenience to a user. For example, the information processing apparatus comprises an MP3 player, a personal digital assistant (PDA), a cell phone, a digital camera, a digital photo frame and a portable multimedia player (PMP). The information processing apparatus may further comprise a portable computer.

The information processing apparatus comprises a mounting slot to detachably attach a peripheral device, such as a secure digital (SD) card, a compact flash (CF) card, a multi media card (MMC) and a universal serial bus (USB), thereto, to input information or data as necessary. Also, the information processing apparatus is small-sized to be portable. The information processing apparatus has become thin, light and small-sized to be portable and provides high performance efficiency and multi-functions.

The conventional information processing apparatus comprises a front cover which has an opening, a display panel having a display part exposed to an outside through the opening of the front cover; and a circuit such as a printed circuit board (PCB) which is provided on a rear part of the display panel to drive the display panel. The conventional information processing apparatus further comprises a shield cover which protects the PCB from an external force and blocks an electromagnetic wave generated by the PCB, and a rear cover which is coupled with the front cover, to accommodate the display panel, the circuit or the shield cover therebetween.

With such a configuration, the display panel, the circuit or the shield cover is coupled with the front cover by a screw, and then the rear cover is coupled with the front cover by a screw.

However, in the conventional information processing apparatus, the display panel or the circuit is coupled with the front cover by a screw, thereby causing a complex configuration and assembly process. Also, since a part of the information processing apparatus that is coupled by a screw is relatively thick, the information processing apparatus becomes heavy in weight and components thereof are enlarged in size.

SUMMARY OF THE INVENTION

The present general inventive concept provides an information processing apparatus which is assembled without difficulty and stably supported and has a light and simple configuration, and a manufacturing method thereof.

Additional aspects and/or advantages of the present general inventive concept will be set forth in part in the description which follows and, in part, will be obvious from the description, or may be learned by practice of the present general inventive concept.

The foregoing and/or other aspects of the present general inventive concept may be achieved by providing an information processing apparatus which comprises a front cover having a display opening to display an image of a display panel and a rear cover which is coupled with the front cover, the apparatus further comprising at least one holder which is formed on a first end of the front cover to prevent the display panel from being separated from the front cover, and a movable holder which is provided on a second end of the front cover to face the holder and prevents the display panel from being separated from the front cover.

The information processing apparatus may further comprise a main circuit substrate which is mounted on a rear part of the display panel to drive the display panel, and a shield cover which is disposed between the main circuit substrate and the rear cover to protect the main circuit substrate.

The rear cover may comprise a plurality of pressure projections which is formed on an internal plate surface of the rear cover to press the display panel, the main circuit substrate, and the shield cover toward the front cover.

The front cover may comprise a pin which is formed on an internal plate surface thereof, and wherein the movable holder comprises a pin accommodator which is coupled with the pin to maintain a position of the front cover.

The movable holder may comprise a substrate coupling part which is formed on a plate surface thereof in a transverse direction to a plate surface of the display panel to support an auxiliary circuit substrate.

The rear cover may comprise a plurality of rear cover coupling holes, and wherein the front cover comprises a front cover coupling part which is coupled with the rear cover coupling holes, and wherein the main circuit substrate and the shield cover comprise a main substrate hole and a shield cover hole which are formed on a predetermined position corresponding to the rear cover coupling holes and the front cover coupling part, respectively.

The foregoing and/or other aspects of the present general inventive concept may also be achieved by providing a method of manufacturing an information processing apparatus which has a front cover having a display opening to display an image of a display panel and a rear cover which is coupled with the front cover, the method comprising forming at least one holder on a first end of the front cover to prevent the display panel from being separated from the front cover, and providing a movable holder on a second end of the front cover to face the holder and preventing the display panel from being separated from the front cover.

The method may further comprise mounting a main circuit substrate on a rear part of the display panel to drive the display panel; and disposing a shield cover between the main circuit substrate and the rear cover to protect the main circuit substrate.

The method may further comprise forming a plurality of pressure projections on an internal plate surface of the rear cover to press the display panel, the main circuit substrate, and the shield cover toward the front cover.

The foregoing and/or other aspects of the present general inventive concept may also be achieved by providing an information processing apparatus which comprises a front cover having a display opening to display an image of a display panel and a rear cover which is coupled with the front cover, the information processing apparatus comprising a main substrate which is provided behind the display panel, and an auxiliary substrate which is disposed in a transverse direction of a plate surface of the main substrate and mounted between the front and rear covers to drive the display panel.

The main substrate may comprise at least one ground pin which is formed on the plate surface of the main substrate and elastically presses the display panel.

The information processing apparatus may further comprise an auxiliary substrate bracket which is provided between the front cover and the rear cover and supports the auxiliary substrate.

The front cover may be formed with at least one coupling pin which is formed on an internal plate surface thereof, and the auxiliary substrate bracket is formed with a coupling pin accommodator which is coupled with the coupling pin.

The information processing apparatus may further comprise a substrate shield cover which is provided between the main substrate and the rear cover to protect the main substrate.

The plate surface of the main substrate may be provided in parallel with the plate surface of the display panel.

The rear cover may comprise at least one supporting projection which includes a bracket slot formed on the internal plate surface thereof and accommodating the auxiliary substrate bracket.

The foregoing and/or other aspects of the present general inventive concept may also be achieved by providing a method of manufacturing an information processing apparatus which has a front cover having a display opening to display an image of a display panel and a rear cover which is coupled with the front cover, the method comprising providing a main substrate behind the display panel that is coupled with the front cover, and mounting an auxiliary substrate in a transverse direction of a plate surface of the main substrate between the front cover and the rear cover to be spaced from the display panel and the main substrate.

The method may further comprise supporting the auxiliary substrate by an auxiliary substrate bracket which is disposed between the front cover and the rear cover.

The method may further comprise forming at least one coupling pin in an internal surface of the front cover, and forming a coupling pin accommodator which is coupled with the coupling pin, in the auxiliary substrate bracket.

The method may further comprise providing a substrate shield cover between the main substrate and the rear cover to protect the main substrate.

The method may further comprise forming at least one supporting projection which includes a bracket slot to accommodate the auxiliary substrate bracket, in the rear cover.

The foregoing and/or other aspects of the present general inventive concept may also be achieved by providing an information processing apparatus having a front cover, a rear cover coupled to the front cover, and a display panel disposed between the front cover and the rear cover, the information processing apparatus including a holder formed on a first portion of the front cover to hold a first end of a display panel, a movable holder disposed on a second portion of the front cover to hold a second end of the display panel, a main substrate disposed between the rear cover and a first portion of the display panel to drive the display panel, and an auxiliary substrate disposed between the rear cover and a second portion of the display panel to drive the display panel.

The foregoing and/or other aspects of the present general inventive concept may also be achieved by providing a method of manufacturing an information processing apparatus having a front cover, a rear cover coupled to the front cover, and a display panel disposed between the front cover and the rear cover, the method including forming a holder on a first portion of the front cover to hole a first end of a display panel, disposing a movable holder on a second portion of the front cover to hold a second end of the display panel, disposing a main substrate between the rear cover and a first portion of the display panel to drive the display panel, and disposing an auxiliary substrate between the rear cover and a second portion of the display panel to drive the display panel.

BRIEF DESCRIPTION OF THE DRAWINGS

The above and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
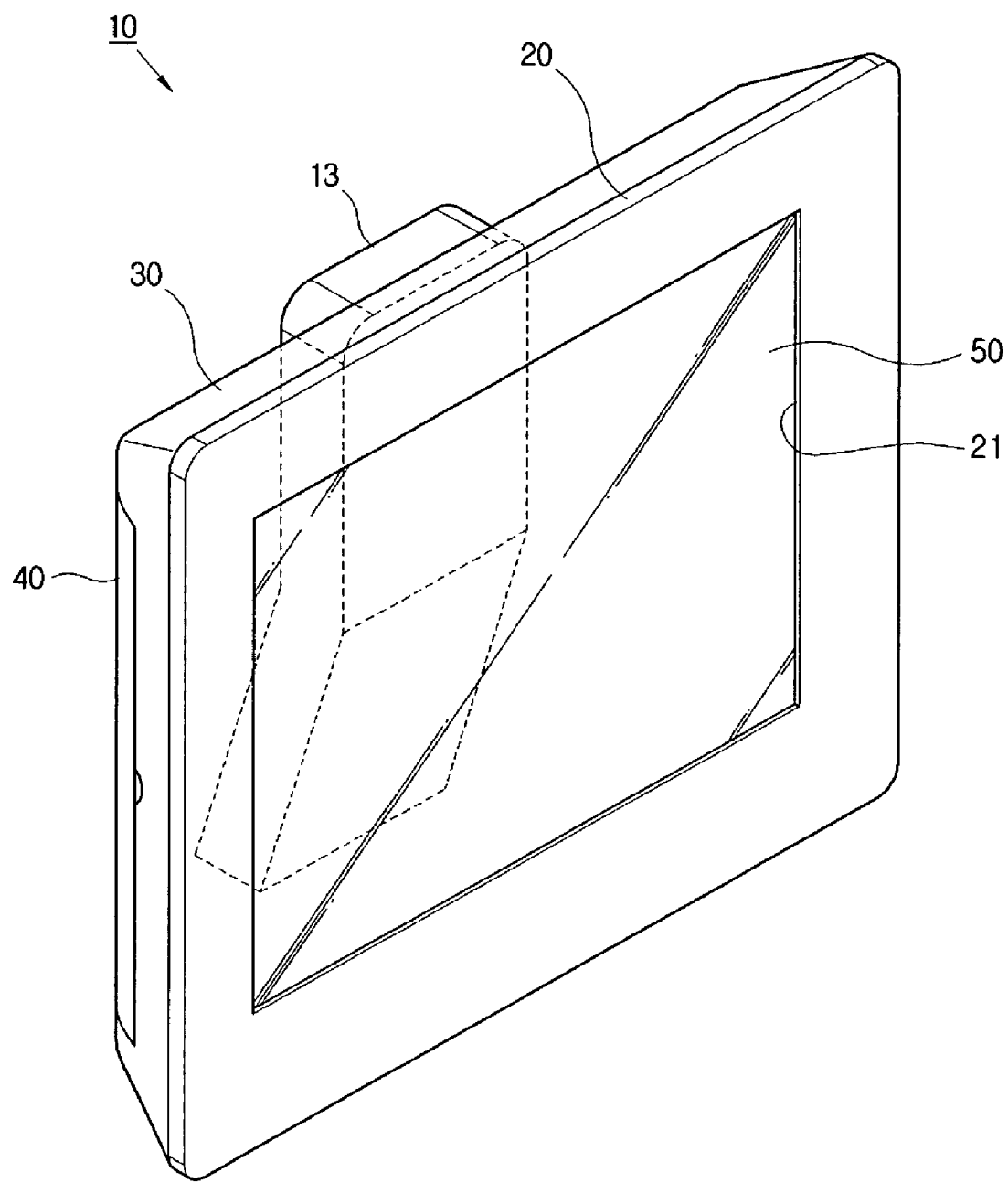
FIG. 1 is a perspective view illustrating an information processing apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a perspective view illustrating an information processing apparatus 10 to process various information. For example, the information processing apparatus 10 comprises an MP3 player, a digital photo frame, a personal digital assistant (PDA), a cell phone, and a portable multimedia player (PMP). The information processing apparatus 10 may further comprise a display apparatus such as a monitor of a personal computer which displays a signal input from an external signal source, or may be a portable computer.

The digital photo frame will be described as an example of the information processing apparatus 10 according to the present embodiment. The digital photo frame is installed on an installing surface such as a table or a wall and comprises a display panel which displays an image thereon. The digital photo frame displays the image which is supplied by a memory card inserted into a slot thereof, instead of inputting an image, a moving picture or an MP3 file captured by a digital camera, etc. to a computer. That is, a user may play or view a moving picture or an image recorded by a digital camera or a camcorder by directly using the digital photo frame. Also, the digital photo frame produces the desired effect as an interior accessory like a photo frame, while displaying the image.

Figure 2:
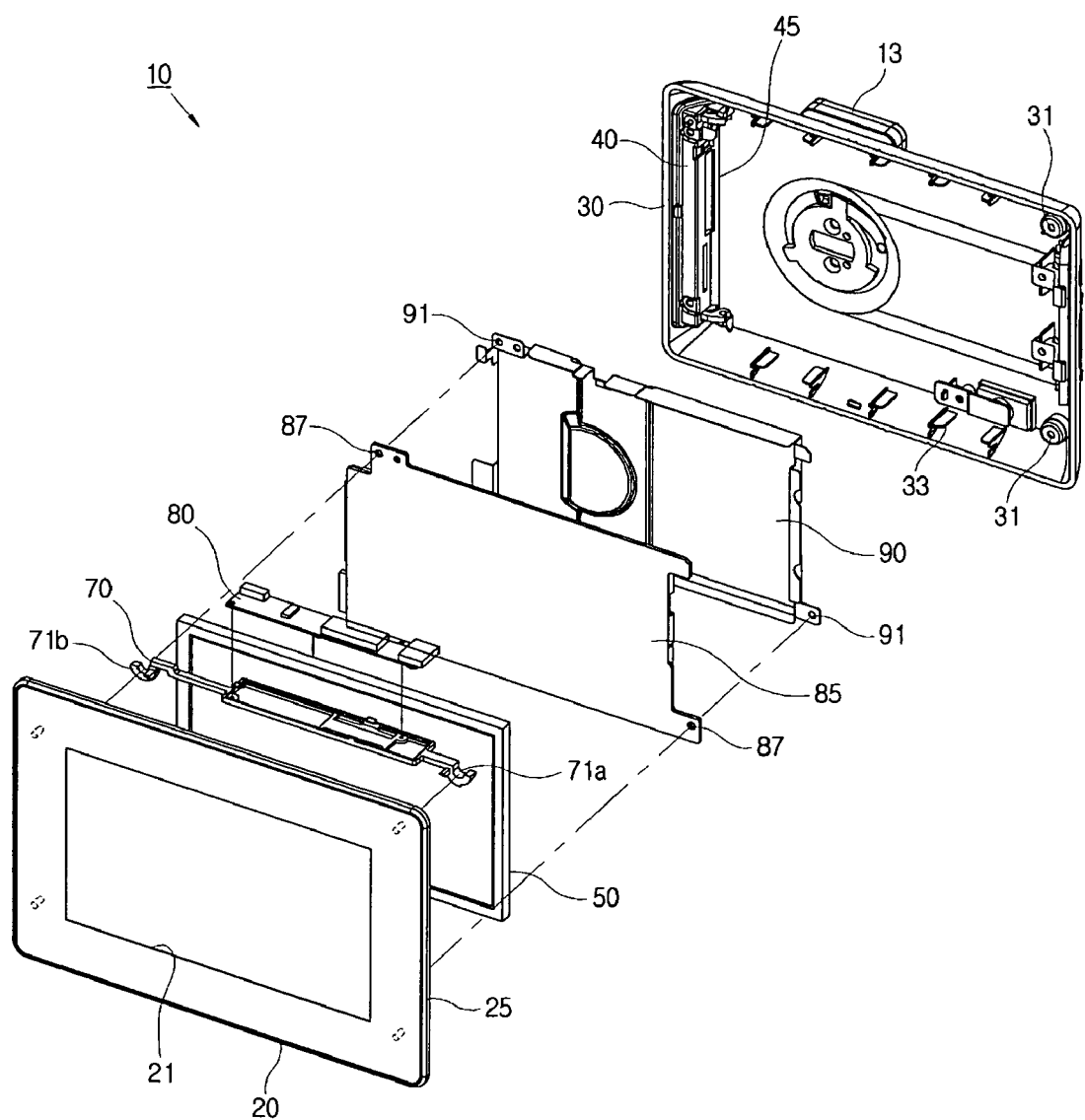
FIG. 2 is an exploded perspective view of the information processing apparatus according to the present general inventive concept.
Figure 3:
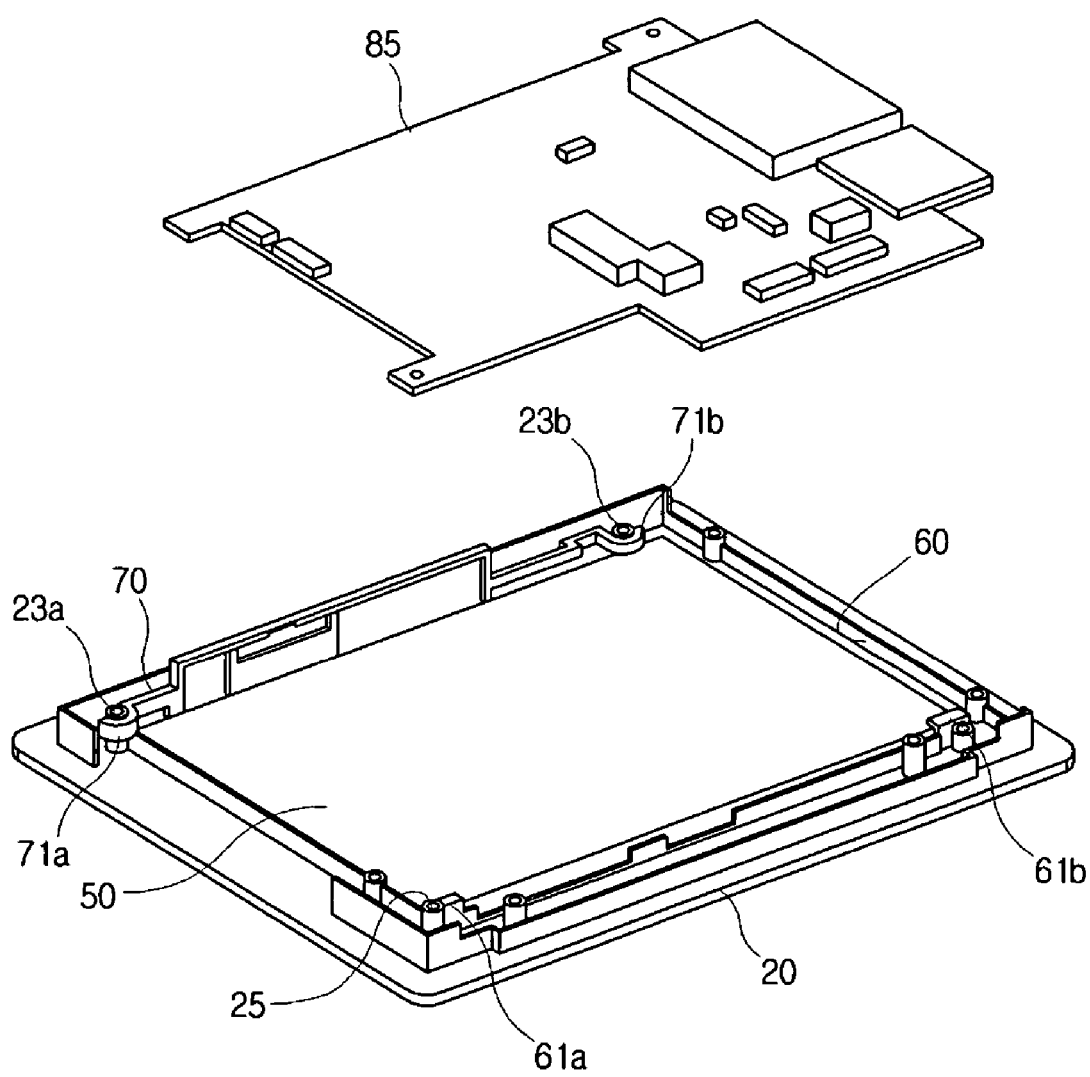
FIG. 3 is a perspective view illustrating a front cover of the information processing apparatus of FIG. 1.

As illustrated in FIGS. 1 through 3, the information processing apparatus 10 according to the present embodiment comprises a front cover 20 having a display opening 21 to display an image formed on a screen of a display panel 50, a rear cover 30 which is coupled with the front cover 20, one or more holders 61a and 61b which are formed on a first end of an inside surface of the front cover 20 in a transverse direction to prevent the display panel 50 from being separated from the front cover 20, and a movable holder 70 which is provided on a second end of the inside surface of the front cover 20 to face the holders 61a and 61b and prevents the display panel 50 from being separated from the front cover 20. The information processing apparatus 10 further comprises a main circuit substrate 85 which is mounted on a rear part of the display panel 50 to drive the display panel 50, and a shield cover 90 which is disposed between the main circuit substrate 85 and the rear cover 30 to protect the main circuit substrate 85. The information processing apparatus 10 further comprises a supporting bracket 13 which is installed on an installing surface, such as a table, to support the information processing apparatus 10 with respect to the installing surface.

Figure 4A:
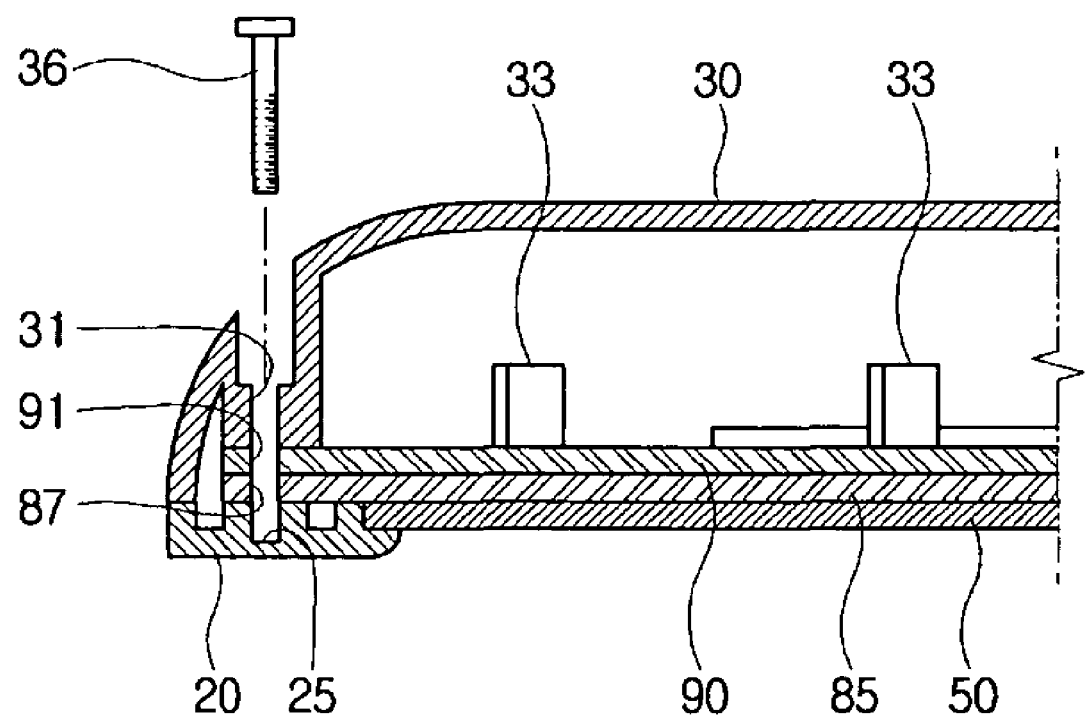
FIG. 4A is a partial sectional view illustrating the front cover coupled to a rear cover of the information processing apparatus of FIGS. 1-3.

The front cover 20 comprises the display opening 21 through which a display part of the display panel 50 is exposed to an outside. The display opening 21 of the front cover 20 has a rectangular shape, but not limited thereto. Alternatively, the display opening 21 of the front cover 20 may have various shapes. The front cover 20 further comprises a panel mounting part 60 to which the display panel 50 is mounted, pins 23a and 23b which are formed on a plate surface (the inside surface) of the front cover 20 to be coupled with the movable holder 70, and a front cover coupling part 25 which is coupled with the rear cover 30 by a screw 36 (FIG. 4A). The front cover 20 is coupled with the rear cover 30, thereby forming an external appearance of the information processing apparatus 10 together with the display panel 50.

The pins 23a and 23b are formed on a rear surface (inside surface) of the front cover 20 to be coupled with pin accommodators 71a and 71b of the movable holder 70. The pins 23a and 23b are disposed adjacent to the panel mounting part 60 provided on a rear upper part of the front cover 20, facing the holders 61a and 61b with respect to the display opening 21.

The rear cover 30 is coupled with the front cover 20 and comprises rear cover coupling holes 31 which are coupled with coupling pins 22 of the front cover 20 to accommodate the display panel 50, the main circuit substrate 85, an auxiliary circuit substrate 80, the movable holder 70, and the shield cover 90 therebetween. The rear cover 30 further comprises a mounting slot 45 which detachably attaches a peripheral device (not shown) thereto, and a door 40 which rotatably opens and closes the mounting slot 45.

Figure 4B:
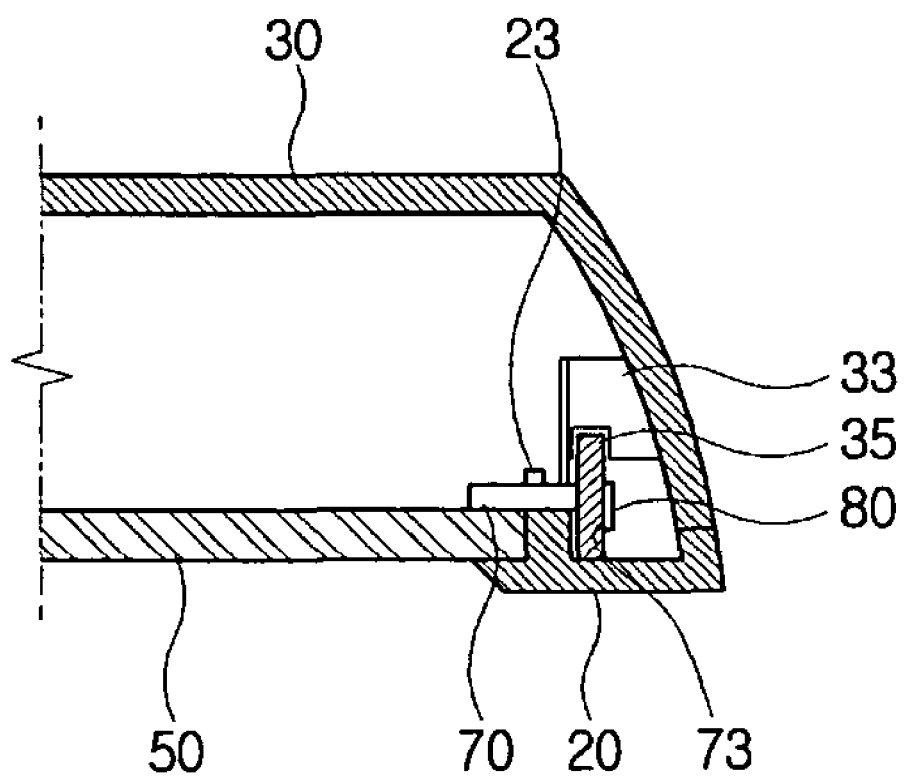
FIG. 4B is a partial sectional view illustrating an auxiliary circuit substrate, the front covers and the rear cover of the information processing apparatus of FIG. 1—when the auxiliary circuit substrate is coupled with the front cover and rear cover.

A pressure projection 33 is formed on an internal plate surface of the rear cover 30 to press the display panel 50, the main circuit substrate 85, and the shield cover 90 toward the front cover 20 as illustrated in FIG. 4A. As illustrated in FIG. 4B, the pressure projection 33 may comprise a groove 35 into which a substrate coupling part 73 of the movable holder 70 disposed in a coupling direction of the front cover 20 and the rear cover 30 is inserted to support the movable holder 70. Accordingly, an additional coupling unit such as a screw is unnecessary to couple components provided between the front and rear covers 20 and 30 as illustrated in FIGS. 4A and 4B. Also, the display panel 50 is stably supported by the pressure projection 33. Thus, the information processing apparatus 10 may comprise a light and simple configuration.

The front cover 20 and the rear cover 30 may comprise a flame retardant material such as polycarbonate and acrylonitrile butadiene styrene.

The door 40 is coupled with the rear cover 30 by a hinge to rotatably open and close the mounting slot 45. A shape of the door 40 may correspond to that of the mounting slot 45 to cover the mounting slot 45.

The display panel 50 is coupled with the front cover 20 such that a screen is exposed through display opening 21 of the front cover 20 to display an image thereon through wired and wireless signals generated from the main circuit substrate 85 or an external device connected to the main circuit substrate 85. The display panel 50 may comprise a liquid crystal display (LCD) which displays an image on a thin plate having pixels by supplying an electrode, a plasma display panel (PDP) which applies gas discharging principles or other conventional panels.

As illustrated in FIG. 3, the panel mounting part 60 is formed along a circumferential part of the front cover 20 to mount the display panel 50 thereon. The panel mounting part 60 is supported by the holders 61a and 61b.

The holders 61a and 61b are formed on the first end of the front cover 20 to prevent the display panel 50 from being separated from the front cover 20. The holders 61a and 61b are projected and bent from the first end of the front cover 20 and have a v-shape. There are provided one or more holders 61a and 61b.

As illustrated in FIGS. 2 and 3, the movable holder 70 is provided on the second end of the front cover 20 to face the holders 61a and 61b with respect to the display opening 21 and prevents the display panel 50 from being separated from the front cover 20. The movable holder 70 is disposed on a rear upper part of the front cover 20 to hold or bias the display panel 50 toward the holders 61a and 61b.

Thus, the display panel 50 is supported by the holders 61a and 61b provided on the rear lower part of the front cover 20 and by the movable holder 70 provided on the rear upper part of the front cover 20, without an additional coupling unit such as a screw. As the display panel 50 is supported and coupled to the front cover 20 without the coupling unit such as the screw, the information processing apparatus 10 may comprise a light and simple configuration. The movable holder 70 comprises the substrate coupling part 73 which supports an auxiliary circuit substrate 80 (to be described later).

The auxiliary circuit substrate 80 is coupled and supported by the substrate coupling part 73 formed on a plate surface of the movable holder 70 in a transverse direction of a plate surface of the display panel 50. The plate surface of the display panel 50 may be perpendicular to the plate surface of the movable holder 70 and may be parallel to the screen to display the image. The auxiliary circuit substrate 80 is electrically coupled with the display panel 50 to provide various illumination to the display panel 50.

The main circuit substrate 85 is disposed on a rear part of the display panel 50 and electrically coupled therewith to display an image on the screen of the display panel 50, and provides/records predetermined information. The main circuit substrate 85 comprises a plurality of main substrate holes 87 formed on a predetermined position corresponding to the front cover coupling part 25 and the rear cover coupling holes 31. Thus, the main circuit substrate 85 is coupled with the front cover 20 and the rear cover 30 without an additional coupling unit, such as a screw, and comprises a simple configuration.

The shield cover 90 is provided on a rear part of the main circuit substrate 85 to protect the main circuit substrate 85. The shield cover 90 comprises a metal material to block an electromagnetic wave generated by the main circuit substrate 85. The shield cover 90 comprises a plurality of shield cover holes 91 which are provided on a predetermined position corresponding to the front cover coupling part 25 and the rear cover coupling holes 31. Thus, the shield cover 90 is coupled with the front cover 20 and the rear cover 30 without an additional coupling unit such as a screw, and comprises a simple supporting configuration. It is possible that the front cover coupling part 25 may be a boss to be inserted into the main substrate hole 87, the shield cover holes 91, and the rear cover coupling hole 31, so that the front cover 20 is coupled to the rear cover 30 without a screw.

With the foregoing configuration, a processing of manufacturing the information processing apparatus 10 according to the present general inventive concept will be described with reference to FIGS. 3 and 5.

The front cover 20 is disposed on a worktable (not shown). Here, a front surface of the front cover 20 faces the worktable. The display panel 50 is inserted into the front cover 20 and mounted to the holders 61*a* and 61*b* (S105).

The pin accommodators 71*a* and 71*b* of the movable holder 70 are coupled with the pins 23*a* and 23*b* so that the movable holder 70 is disposed on a predetermined position to press the display panel 50 (S110).

Then, the main circuit substrate 85 is stably seated on the display panel 50 (S115).

The shield cover 90 is disposed on an upper part of the main circuit substrate 85 to couple the shield cover holes 91 of the shield cover 90 with the front cover coupling part 25 (S120).

The plurality of pressure projections 33 is formed on an inside plate surface of the rear cover 30 to press the display panel 50, the main circuit substrate 85, and the shield cover 90 toward the front cover 20 (S125).

Figure 5:
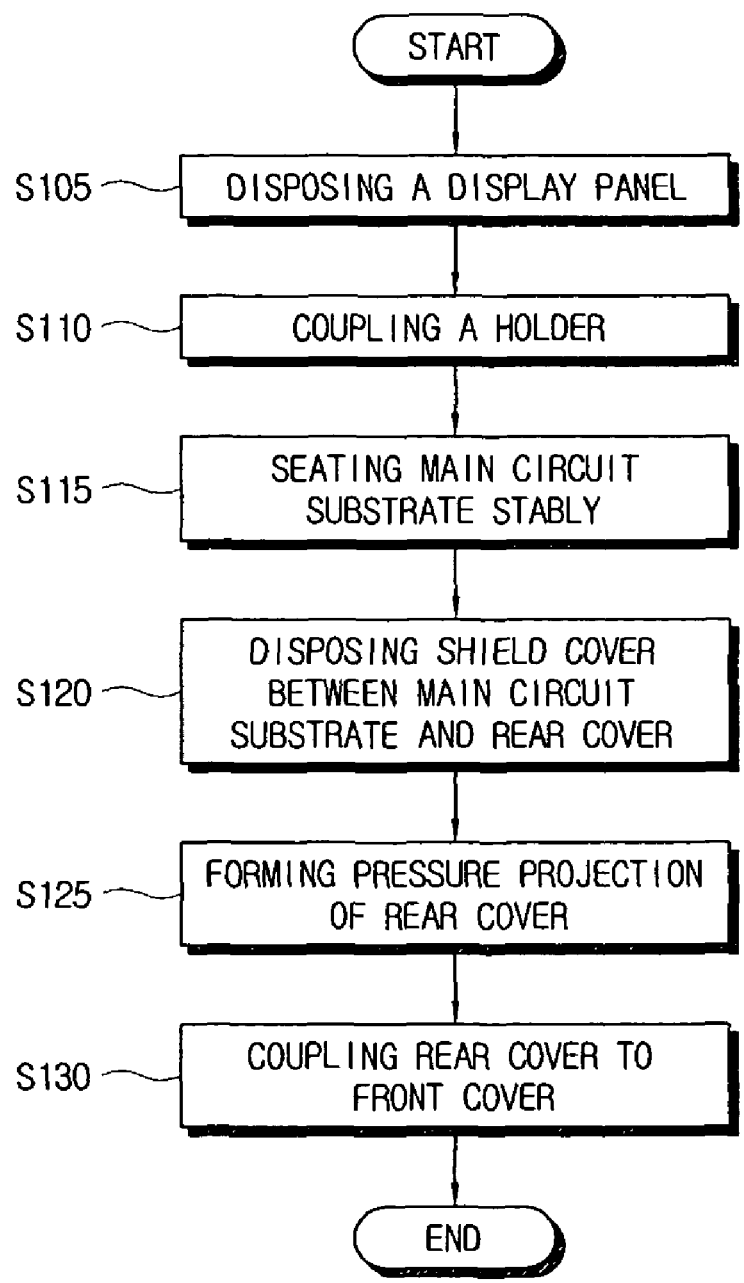
FIG. 5 is a flowchart illustrating a method of manufacturing an information processing apparatus according to an embodiment of the present general inventive concept.

As illustrated in FIGS. 4A, 4B and 5, the rear cover 30 is disposed on the shield cover 90 so that the front cover coupling part 25 corresponds to the rear cover coupling holes 31, and coupled with the front cover 20 by a screw 36 (S130). Then, the pressure projections 33 of the rear cover 30 press the display panel 50, the movable holder 70, the main circuit substrate 85, and the shield cover 90 toward the front cover 20. Although the front coupling part 25 is formed as the boss to be coupled to the rear cover 30 as described above, the screw 36 may be used to couple the boss and the rear cover 30.

The digital photo frame is provided as an example of the present general inventive concept, but not limited thereto. Alternatively, the present invention can be applicable to a portable information processing apparatus such as a PDA and a PMP.

According to the present embodiment, as the components such as the display panel provided between the front cover and the rear cover are not coupled by the additional coupling unit such as a screw, the information processing apparatus is assembled without difficulty, is stably supported, and comprises a light and simple configuration.

Figure 6:
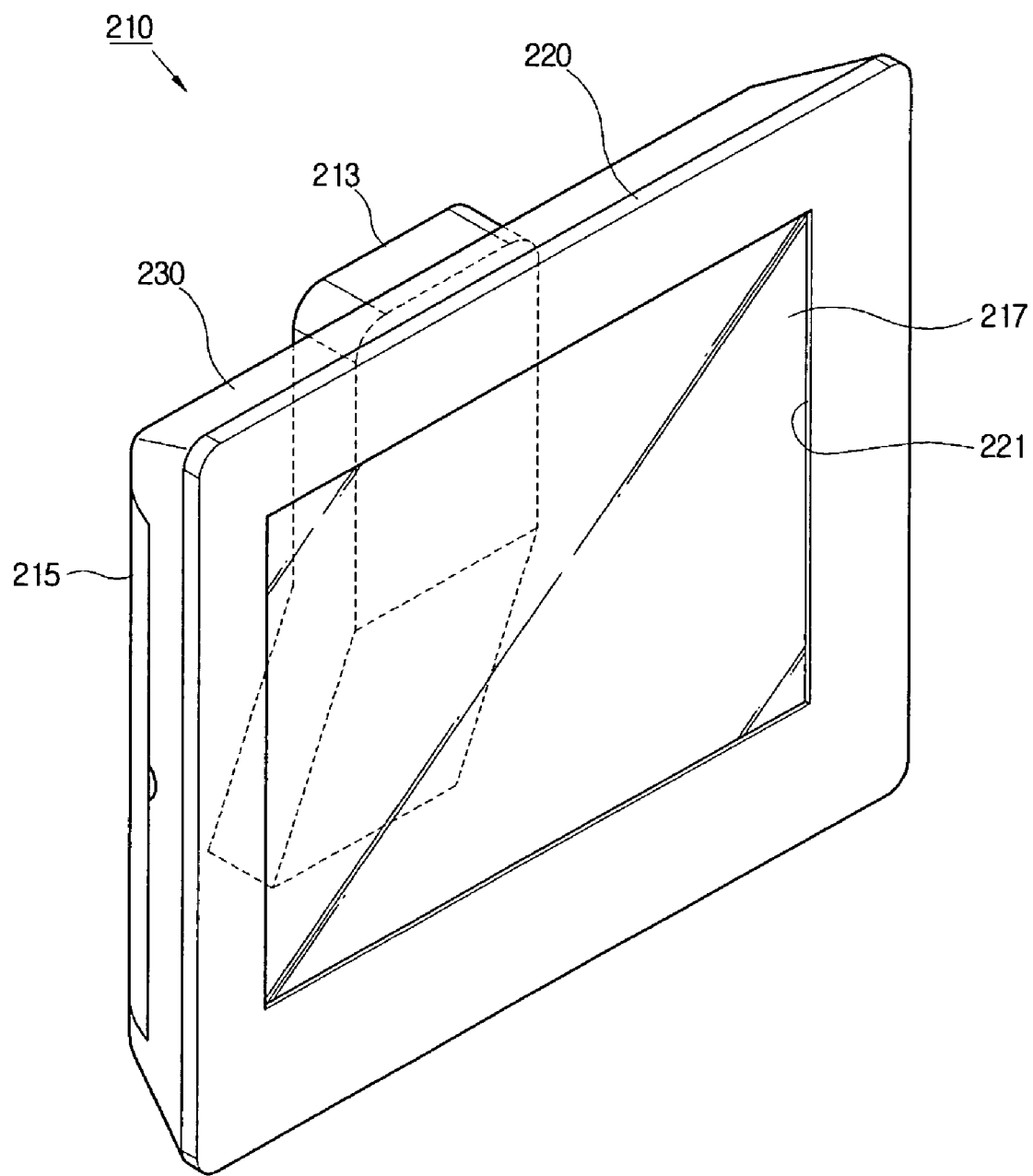
FIG. 6 is a perspective view illustrating an information processing apparatus according to an embodiment of the present general inventive concept.
Figure 7:
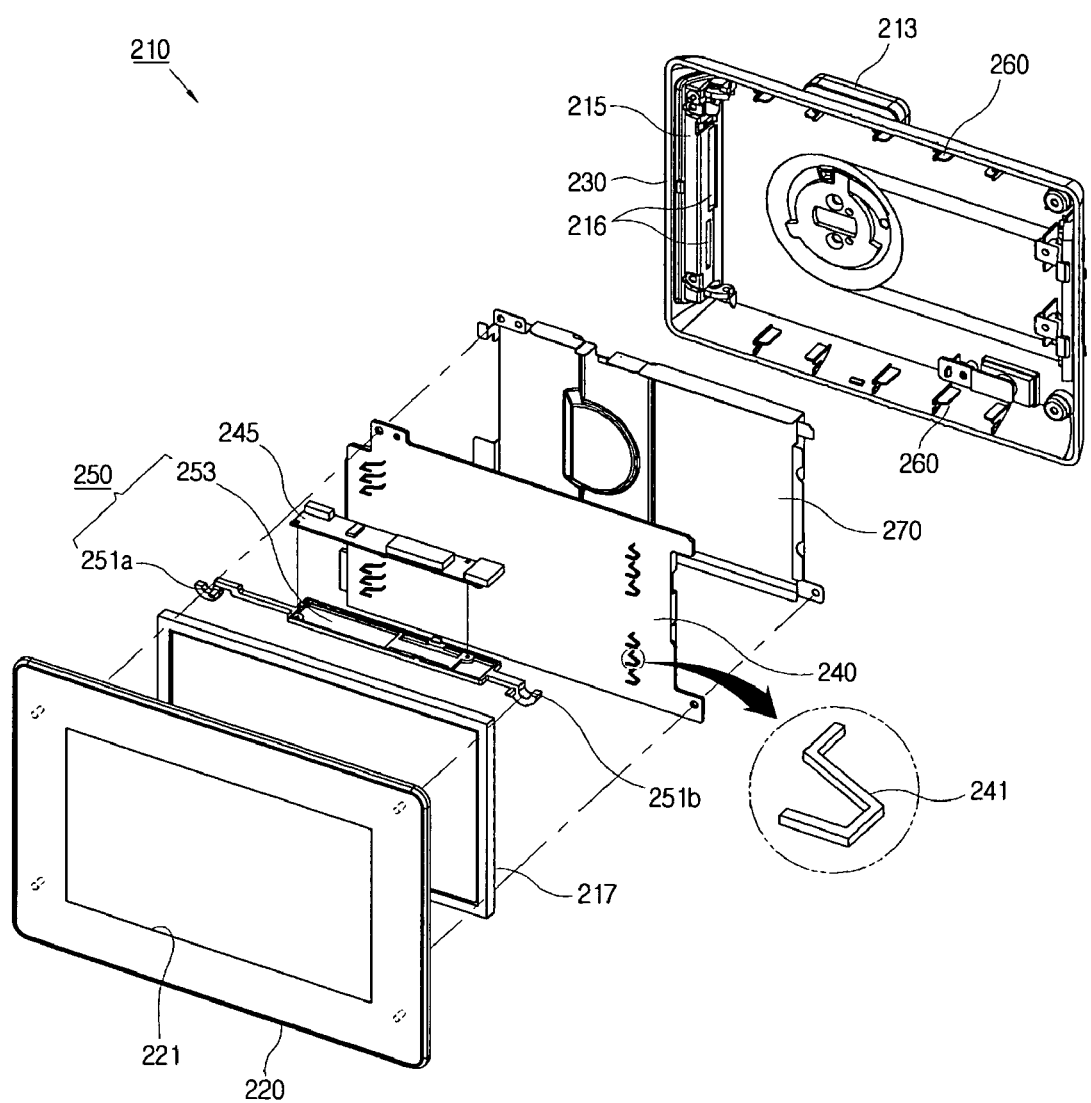
FIG. 7 is an exploded view illustrating the information processing apparatus of FIG. 6.
Figure 8:
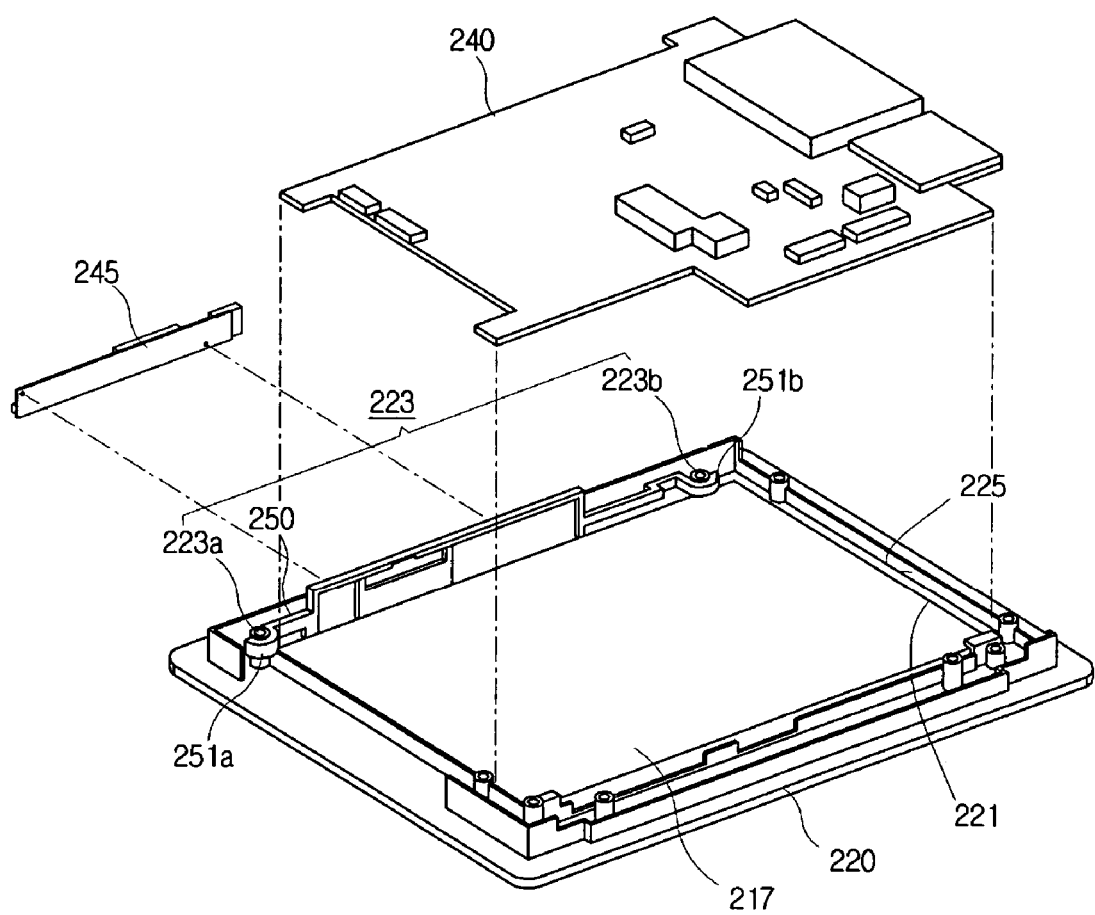
FIG. 8 is a perspective view illustrating a front cover of the information processing apparatus of FIGS. 6 and 7.

Referring to FIGS. 6 to 8, an information processing apparatus 210 according to an embodiment of the present general inventive concept comprises a front cover 220 having a display opening 221 through which an image formed on a screen of a display panel 217 is displayed a rear cover 230 which is coupled with the front cover 220, a main substrate 240 which is provided behind the display panel 217 to drive the display panel 217, and an auxiliary substrate 245 which is mounted between the front cover 220 and the rear cover 230 to be provided in a transverse direction of the main substrate 240 and spaced from the display panel 217 and the main substrate 240. The information processing apparatus 210 further comprises a substrate shield cover 270 which is provided between the main substrate 240 and the rear cover 230 to protect the main substrate 240. The information processing apparatus 210 further comprises a supporting bracket 213 which is installed on an installing surface such as a desk to support the rear cover 230 with respect to the installing surface.

A door 215 is coupled with the rear cover 230 by a hinge and rotatably opens and closes a mounting slot 216. A shape of the door 215 may correspond to that of the mounting slot 216 of the rear cover 230 to cover the mounting slot 216.

A description of the display panel 217 of FIG. 6 will be omitted here, since it is the same as that of the display panel 50 of FIG. 1.

As illustrated in FIG. 7, the front cover 220 comprises the display opening 221 through which a display part of the display panel 217 is exposed. The display opening 221 of the front cover 220 has a rectangular shape but not limited thereto. Alternatively, a shape of the display opening 221 may vary. The front cover 220 comprises a coupling pin 223 (223*a* and 223*b*) which is formed on an inside plate surface of the front cover 220 and coupled with an auxiliary substrate bracket 250, and a panel mounting part 225 in which the display panel 217 is mounted. The front cover 220 is coupled with the rear cover 230, thereby completing an external appearance of the information processing apparatus 210 together with the display panel 217.

As illustrated in FIG. 8, the coupling pins 223*a* and 223*b* are formed on the inside plate surface of the front cover 220 and coupled with a coupling pin accommodator 251 (251*a* and 251*b*) of the auxiliary substrate bracket 250.

The panel mounting part 225 is formed on a circumference of the front cover 220 in which the display panel 217 is mounted.

The rear cover 230 may be coupled with the front cover 220 by a screw, etc. The display panel 217, the main substrate 240, the auxiliary substrate 245, the auxiliary substrate bracket 250, and the substrate shield cover 270 are provided between the front cover 220 and the rear cover 230. The rear cover 230 is provided with a supporting projection 260 formed on an inside plate surface thereof. The supporting projection 260 comprises a bracket slot 261 to accommodate the auxiliary substrate bracket 250. The rear cover 230 is provided with the mounting slot 216 to which a peripheral device (not shown) is detachably mounted, and the door 215 which rotatably opens and closes the mounting slot 216.

The front cover 220 and the rear cover 230 comprise resin such as polycarbonate and acrylonitrile butadiene styrene which are resistant to fire.

The main substrate 240 and the auxiliary substrate 245 are electrically coupled with each other and provided behind the display panel 217. The main substrate 240 and the auxiliary substrate 245 are electrically coupled with the display panel 217 and drive the display panel 217 to display an image. The main substrate 240 may drive a flash memory, an SD card and a CF card, as well as the display panel 217 to generate and display the image. A plate surface of the main substrate 240 is provided in parallel with a plate surface of the display panel 217. The main substrate 240 and the auxiliary substrate 245 are not stacked and spaced from each other. The main substrate 240 is disposed on a first portion of the display panel 217 and the auxiliary substrate 245 is disposed on a second portion of the display panel 217. As the main substrate 240 and the auxiliary substrate 245 are not stacked with each other, the information processing apparatus 210 becomes relatively slim. A plurality of integrated circuits (IC) (not illustrated) is mounted in opposite lateral parts of the main substrate 240. The main substrate 240 further comprises at least one ground pin 241 which is formed on the plate surface thereof and elastically presses the display panel 217.

Figure 9:
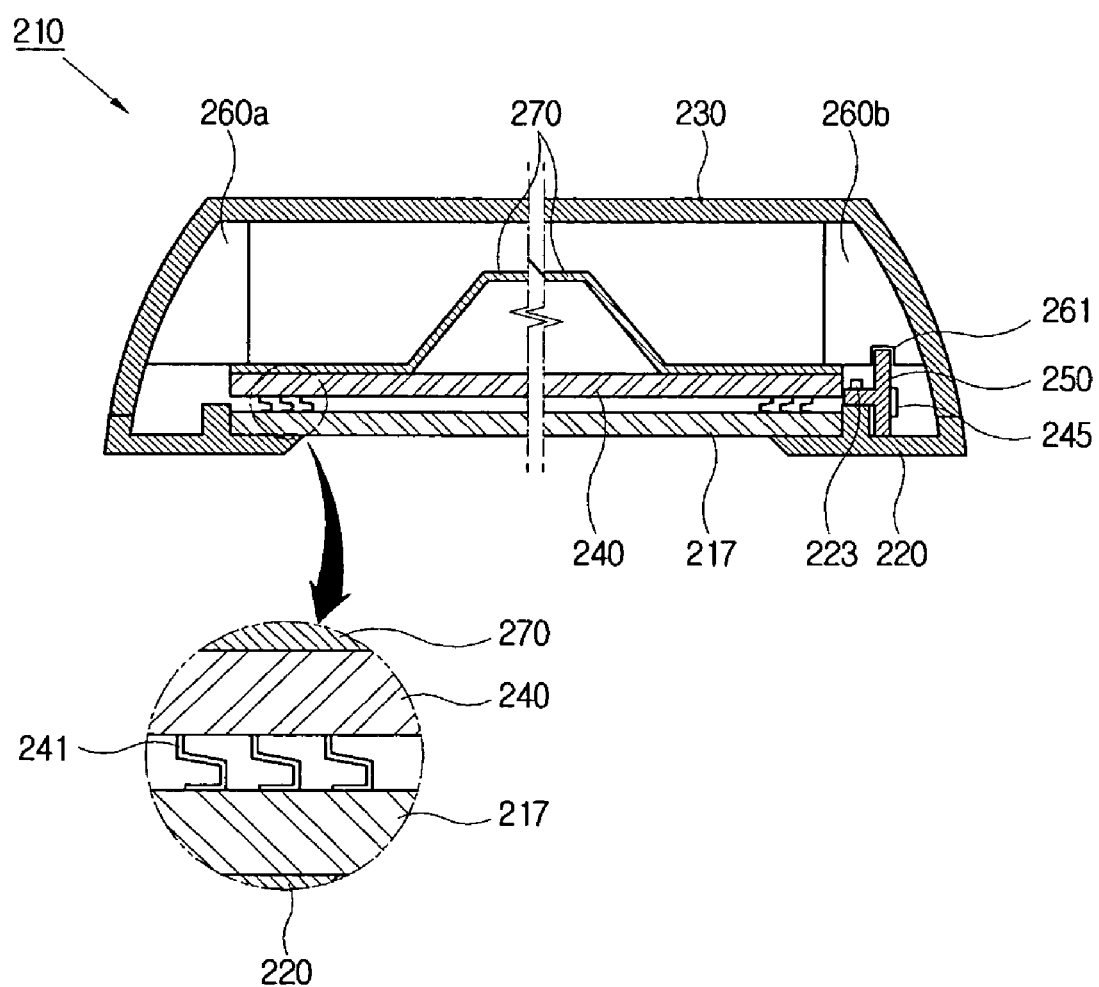
FIG. 9 is a view illustrating the front cover coupled to a rear cover of the information processing apparatus of FIGS. 6-8.

As illustrated in FIGS. 7 and 9, at least one ground pin 241 is formed on the plate surface of the main substrate 240 and projected toward the display panel 217 to elastically press the display panel 217. The ground pin 241 comprises copper which is elastic. The ground pin 241 may be variously disposed on the plate surface of the main substrate 240 as necessary. The ground pin 241 makes the main substrate 240 connected with ground and also prevents the ICs of the main substrate 240 from being in contact with the display panel 217. The ground pin 241 may be in plural and may have a first portion extended from the main substrate 240 and a second portion extended from the first portion toward the display panel 217. A distal end of the second portion is bent. The display panel 217 and the main substrate 240 maintain spaced-apart by the ground pin 241.

The auxiliary substrate 245 is coupled with a substrate coupling part 253 which is formed on the auxiliary substrate bracket 250 in a transverse direction of the plate surface of the display panel 217. The auxiliary substrate 245 is electrically coupled with the display panel 217 to provide various levels of brightness to the display panel 217. The auxiliary substrate 245 is supported by a bracket slot 261 of the rear cover 230 and the front cover 220. As the main substrate 240 and the auxiliary substrate 245 are not stacked with each other, the information processing apparatus 210 remains slim. A power supply and a circuit driver of the main substrate 240 and the auxiliary substrate 245 are separated from each other, thereby supplying signals and power to the display panel 217 stably.

As shown in FIGS. 7 and 8, the auxiliary substrate bracket 250 is coupled by the bracket slot 261 of the rear cover 230 to the front cover 220. The auxiliary substrate bracket 250 comprises the coupling pin accommodator 251 (251a and 251b) which is formed on the plate surface thereof and coupled with the coupling pin 223. The auxiliary substrate bracket 250 further comprises the substrate coupling part 253 which is coupled with the auxiliary substrate 245. As the auxiliary substrate 245 and the main substrate 240 are not stacked with each other, the information processing apparatus 210 remains relatively slim.

As illustrated in FIGS. 7 and 9, at least one supporting projection 260 is formed on an inside plate surface of the rear cover 230 to press the circumference of the display panel 217, the main substrate 240, and the substrate shield cover 270 toward the front cover 220. The supporting projection 260 comprises the bracket slot 261 which accommodates the auxiliary substrate bracket 250. As the supporting projection 260 presses and couples components such as the main substrate 240 in the front and rear covers 220 and 230, an additional coupling unit such as a screw is not necessary. As the auxiliary substrate 245 is coupled with the auxiliary substrate bracket 250 on an area where it is separated from the main substrate 240, thereby maintaining the information processing apparatus 210 slim.

The substrate shield cover 270 is provided behind the main substrate 240 and protects the main substrate 240. The substrate shield cover 270 comprises metal to block electronic waves which are generated by the main substrate 240.

Figure 10:
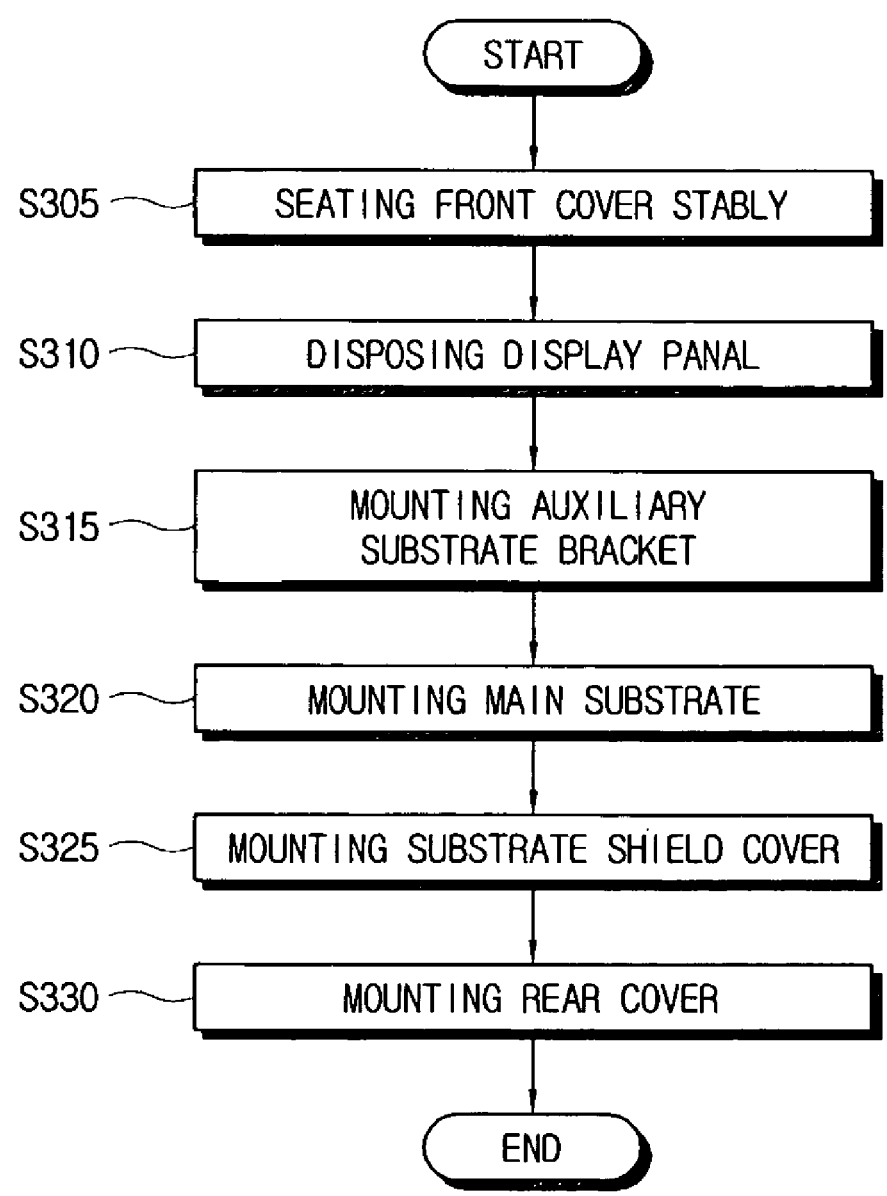
FIG. 10 is a flowchart illustrating a method of manufacturing an information processing apparatus according to an embodiment of the present general inventive concept.

With the foregoing configuration, the manufacturing process of the information processing apparatus 210 according to the present invention will be described with reference to FIGS. 8 and 10.

As shown therein, the front cover 220 is disposed on a working table (not shown) (S305).

The display panel 217 is mounted in the front cover 220 (S310).

The auxiliary substrate bracket 250 is mounted in the front cover 220 to support the auxiliary substrate 245 on an area where the display panel 217 is spaced therefrom, and couple the coupling pin 223 (223a and 223b) with the coupling pin accommodator 251 (251a and 251b) (S315). The auxiliary substrate 245 may be electrically connected with the display panel 217 through a connector or a cable (not illustrated).

The main substrate 240 is disposed on the display panel 217 so that the plate surface of the main substrate 240 is provided in parallel with that of the display panel 217 (S320). The main substrate 240 formed with the ground pin 241 is disposed toward the display panel 217. The main substrate 240 may be electrically connected with the display panel 217 through another connector or another cable.

The substrate shield cover 270 is provided on the main substrate 240 (S325).

The circumference of the display panel 217, the main substrate 240, and the substrate shield cover 270 are coupled with the front cover 220 and the rear cover 230 to be pressed toward the front cover 220 (S330). That is, the supporting projection 260 of the rear cover 230 sequentially presses the display panel 217, the main substrate 240, and the substrate shield cover 270. The rear cover 230 is coupled with the front cover 220 so that the auxiliary substrate bracket 250 is coupled with the bracket slot 261 of the rear cover 230. The front cover 230 and the rear cover 230 of FIGS. 6-9 may be coupled in the similar manner to the front cover 20 and the rear cover 30 of FIGS. 1-5.

Alternatively, the present general inventive concept can be applicable to a portable information processing apparatus such as a PDA and a PMP.

The information processing apparatus according to the present general inventive concept becomes relatively slim as the components such as the auxiliary substrate mounted between the front and rear covers are not stacked with the each other and requires small space. Thus, the components can be stably supported.

As described above, an information processing apparatus which is assembled without difficulty, stably supported and comprises a light and simple configuration, and a manufacturing method thereof are provided.

Also, the present invention provides an information processing apparatus which is relatively small and requires small space as components mounted between front and rear covers are not stacked with each other and supports components stably, and a manufacturing method thereof.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An information processing apparatus which comprises a front cover having a display opening to display an image on a display plate surface of a display panel and a rear cover which is coupled with the front cover, the apparatus further comprising:
   at least one holder which is formed on a first end of the front cover to prevent the display panel from being separated from the front cover;
   an auxiliary circuit substrate to drive the display panel; and
   a movable holder which is provided on a second end of the front cover to face the at least one holder and prevents the display panel from being separated from the front cover, such that the movable holder comprises a substrate coupling part to directly support the auxiliary circuit substrate along a plate surface thereon perpendicular to the display plate surface.

2. The information processing apparatus according to claim 1, further comprising:
   a main circuit substrate which is mounted between the display panel and the rear cover connected to the auxiliary circuit substrate to drive the display panel; and
   a shield cover which is disposed between the main circuit substrate and the rear cover to protect the main circuit substrate.

3. The information processing apparatus according to claim 2, wherein the rear cover comprises a plurality of pressure projections which is formed on an inside plate surface of the rear cover to press the display panel, the main circuit substrate, and the shield cover toward the front cover.

4. The information processing apparatus according to claim 3, wherein:
   the rear cover comprises a plurality of rear cover coupling holes; and
   the front cover comprises a front cover coupling part which is coupled with the rear cover coupling holes; and
   the main circuit substrate and the shield cover comprise a main substrate hole and a shield cover hole, respectively, which are formed on a predetermined position corresponding to the rear cover coupling holes and the front cover coupling part, respectively.

5. The information processing apparatus according to claim 1, wherein:
   the front cover comprises a pin which is formed on an inside plate surface thereof, and
   the movable holder comprises a pin accommodator which is coupled with the pin to maintain a position of the front cover.

6. A method of manufacturing an information processing apparatus which has a front cover having a display opening to display an image on a display plate surface of a display panel and a rear cover which is coupled with the front cover as well as an auxiliary circuit substrate to drive the display panel, the method comprising:
   forming at least one holder on a first end of the front cover to prevent the display panel from being separated from the front cover; and
   providing a movable holder on a second end of the front cover to face the holder and preventing the display panel from being separated from the front cover, such that the movable holder comprises a substrate coupling part to directly support the auxiliary circuit substrate along a plate surface thereon perpendicular to the display plate surface.

7. The method according to claim 6, further comprising:
   mounting a main circuit substrate on a rear part of the display panel to drive the display panel; and
   disposing a shield cover between the main circuit substrate and the rear cover to protect the main circuit substrate.

8. The method according to claim 7, further comprising:
   forming a plurality of pressure projections on an internal plate surface of the rear cover to press the display panel, the main circuit substrate and the shield cover toward the front cover.

9. An information processing apparatus which comprises a front cover having a display opening to display an image of a display panel and a rear cover which is coupled with the front cover, further comprising:
   a main substrate which is provided between the display panel and the rear cover to drive the display panel;
   an auxiliary substrate which is disposed in a transverse direction of a plate surface of the main substrate and mounted between the front and rear covers to drive the display panel according to control of the main substrate; and
   a movable holder which is provided on a second end of the front cover to prevent the display panel from being separated from the front cover, such that the movable holder comprises a substrate coupling part to directly support the auxiliary substrate.

10. The information processing apparatus according to claim 9, wherein the main substrate comprises at least one ground pin which is formed on a plate surface of the main substrate and elastically presses the display panel.

11. The information processing apparatus according to claim 9, further comprising:
   an auxiliary substrate bracket which is provided between the front cover and the rear cover and supports the auxiliary substrate.

12. The information processing apparatus according to claim 11, wherein the front cover comprises at least one coupling pin which is formed on an internal plate surface thereof, and the auxiliary substrate bracket comprises a coupling pin accommodator which is coupled with the coupling pin.

13. The information processing apparatus according to claim 11, wherein the rear cover comprises at least one supporting projection which includes a bracket slot formed on an inside plate surface thereof to accommodate the auxiliary substrate bracket.

14. The information processing apparatus according to claim 9, further comprising:
   a substrate shield cover which is provided between the main substrate and the rear cover to protect the main substrate.

15. The information processing apparatus according to claim 9, wherein the plate surface of the main substrate is provided in parallel with the plate surface of the display panel.

16. A method of manufacturing an information processing apparatus which has a front cover having a display opening to display an image of a display panel and a rear cover which is coupled with the front cover, comprising:
   providing a main substrate between the display panel and the rear cover that is coupled with the front cover;
   mounting an auxiliary substrate in a transverse direction of a plate surface of the main substrate between the front cover and the rear cover to be spaced from the display panel and the main substrate to drive the display panel; and
   providing a movable holder on a second end of the front cover to prevent the display panel from being separated from the front cover, such that the movable holder comprises a substrate coupling part to directly support the auxiliary substrate.

17. The method according to claim 16, further comprising:
supporting the auxiliary substrate by an auxiliary substrate bracket which is disposed between the front cover and the rear cover.

18. The method according to claim 17, further comprising:
forming at least one coupling pin in an internal surface of the front cover; and
forming a coupling pin accommodator which is coupled with the coupling pin, in the auxiliary substrate bracket.

19. The method according to claim 17, further comprising:
forming at least one supporting projection which includes a bracket slot to accommodate the auxiliary substrate bracket, in the rear cover.

20. The method according to claim 16, further comprising:
providing a substrate shield cover between the main substrate and the rear cover to protect the main substrate.

21. An information processing apparatus having a front cover, a rear cover coupled to the front cover, and a display panel disposed between the front cover and the rear cover with a display plate surface to display an image thereon, comprising:
a holder formed on a first portion of the front cover to hold a first end of a display panel;
a movable holder disposed on a second portion of the front cover to hold a second end of the display panel;
a main substrate disposed between the rear cover and a first portion of the display panel to drive the display panel; and
an auxiliary substrate disposed between the rear cover and a second portion of the display panel to drive the display panel;
wherein the movable holder comprises a substrate coupling part to directly support the auxiliary substrate along a plate surface thereon perpendicular to the display plate surface.

22. A method of manufacturing an information processing apparatus having a front cover, a rear cover coupled to the front cover, and a display panel disposed between the front cover and the rear cover with a display plate surface to display an image thereon, the method comprising;
forming a holder on a first portion of the front cover to hole a first end of a display panel;
disposing a movable holder on a second portion of the front cover to hold a second end of the display panel;
disposing a main substrate between the rear cover and a first portion of the display panel to drive the display panel; and
disposing an auxiliary substrate between the rear cover and a second portion of the display panel to drive the display panel, such that the auxiliary substrate is directly supported by a substrate coupling part on the movable holder along a plate surface thereon perpendicular to the display plate surface.

* * * * *